(12) United States Patent
Hansen (10) Patent No.: US 12,234,616 B2
(45) Date of Patent: Feb. 25, 2025

(54) GROUTING METHOD

(71) Applicant: Illinois Tool Works Inc., Glenview, IL (US)

(72) Inventor: Flemming Frost Hansen, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 276 days.

(21) Appl. No.: 17/778,484

(22) PCT Filed: Nov. 20, 2020

(86) PCT No.: PCT/US2020/061463
§ 371 (c)(1),
(2) Date: May 20, 2022

(87) PCT Pub. No.: WO2021/102233
PCT Pub. Date: May 27, 2021

(65) Prior Publication Data
US 2023/0002994 A1    Jan. 5, 2023

(30) Foreign Application Priority Data

Nov. 21, 2019 (EP) ..................................... 19210793
Jul. 1, 2020 (EP) ..................................... 20183555

(51) Int. Cl.
*E02B 17/00* (2006.01)
*E02D 27/52* (2006.01)

(52) U.S. Cl.
CPC .......... *E02B 17/0008* (2013.01); *E02D 27/52* (2013.01); *E02B 2017/0039* (2013.01); *E02D 2250/003* (2013.01); *E02D 2250/0061* (2013.01)

(58) Field of Classification Search
CPC ................ E02B 17/0008; E02D 27/52; E02D 2017/0039; E02D 2250/003; E02D 2250/0061
See application file for complete search history.

(56) References Cited

U.S. PATENT DOCUMENTS 4,070,869 A    1/1978 Williams
4,191,492 A  * 3/1980 Cobbs ....................... E21D 5/00
                                                  405/133
(Continued)

FOREIGN PATENT DOCUMENTS

CN         205046588 U    2/2016
JP         2010236192 A   10/2010
(Continued)

OTHER PUBLICATIONS

Int'l Search Reported issued in PCT/US2020/061463, dated Feb. 18, 2021.
(Continued)

*Primary Examiner* — Kyle Armstrong
(74) *Attorney, Agent, or Firm* — MaxGoLaw PLLC (57) ABSTRACT

A method of fixing an offshore structure to a pre-piled foundation pile is provided. A tube is piled into the sea floor and the offshore structure includes a leg inserted into the foundation pile. Grout is applied to a first region between an end portion of the leg and the sea floor within the foundation pile. The grout is allowed to at least partially cure, and then grout is applied to a second region. The second region is an annular region between the leg and the foundation pile.

15 Claims, 6 Drawing Sheets

(56) References Cited

U.S. PATENT DOCUMENTS

| | | | |
|---|---|---|---|
| 4,789,271 A | 12/1988 | Sullaway et al. | |
| 2011/0135401 A1 | 6/2011 | Hall | |
| 2013/0149039 A1 | 6/2013 | Haugsoen et al. | |
| 2015/0368871 A1 | 12/2015 | Seidel et al. | |
| 2022/0106757 A1* | 4/2022 | Bartminn | ................ E02D 5/526 |

FOREIGN PATENT DOCUMENTS

| | | |
|---|---|---|
| JP | 2014084555 A | 5/2014 |
| JP | 2017115374 A | 6/2017 |
| JP | 2017133199 A | 8/2017 |

OTHER PUBLICATIONS

Office Action issued in corresponding Japanese Patent Appln. No. 2022-529342, dated Aug. 27, 2024 (no translation available).

* cited by examiner

GROUTING METHOD

FIELD OF THE INVENTION

This invention relates generally to a grouting method. More particularly, this invention relates to a method of applying grout to the leg of an offshore structure. More specifically, although not exclusively, this invention relates to a method of fixing an offshore structure to a pre-piled foundation pile.

BACKGROUND OF THE INVENTION

Offshore structures, commonly present in both the offshore wind and offshore oil and gas industries, most often include a structural jacket supporting a payload above the surface of the water. In the offshore wind industry, the payload is a wind turbine, and in the offshore oil and gas industry, the payload tends to be a processing and/or accommodation platform.

The structural jacket is secured to the seabed via one or more foundation piles, which often take the form of hollow tubes piled into the seabed. In order to secure the structural jacket to the foundation piles, and therefore the seabed, a cementitious material commonly known as grout is applied to the foundation. The grout is applied such that the interface between each foundation pile and respective leg of the jacket is filled. The grout is subsequently left to cure. Conventionally, the grout is applied from a pump unit on the surface via a pipe or hose.

SUMMARY OF THE INVENTION

According to an aspect of the invention, there is provided a method for fixing an offshore structure to a pre-piled foundation pile, wherein the foundation pile comprises a tube piled into the sea floor and the offshore structure comprises a leg inserted into the foundation pile, wherein the method comprises applying grout to a first region between an end portion of the leg and the sea floor within the foundation pile, allowing the grout to at least partially cure, and then applying grout to a second region, wherein the second region is an annular region between the leg and the foundation pile.

The end portion of the leg may be commonly referred to as a stab-in or a stab-in portion of the leg.

The offshore structure may be configured to support a payload above the surface of water. The payload may be mounted to the offshore structure, e.g. a jacket thereof, after grouting has been completed. The payload may be or may comprise a wind turbine or oil and gas platform.

The present method may be particularly advantageous in the case that the payload is a wind turbine. In such a case, there may be cyclical side loading applied to the offshore structure, e.g. due to wind and/or operation of the wind turbine. The structural integrity of the foundation, as a result of the present invention, may provide a more reliable structure when subject to such side loading.

The leg or stab-in may be inserted into an open end of the foundation pile.

The offshore structure may comprise a plurality of foundation piles and the jacket may comprise a plurality of corresponding legs. Each leg may be inserted into an open end of a respective foundation pile.

The method may comprise applying the grout to the first regions of all of the plurality of foundation piles prior to applying the grout to the second regions of the plurality of foundation piles.

The grout applied to the first region may be left to cure, e.g. to a predetermined degree, before applying the grout to the second region. The grout applied to the first region may be left to cure until firm or hard, or substantially firm or hard, before applying the grout to the second region. The grout applied to the first region may be left to cure until it reaches its final set before applying the grout to the second region.

The grout applied to the region between an end portion of the leg and the sea floor may be or comprise a first grout. The grout applied to the annular region between a leg and a foundation pile may be or comprise a second grout. The first grout may be different to the second grout. That is, the first grout may have a different composition to the second grout. The first grout may be left to cure, e.g. to a predetermined degree, before applying the second grout.

The first grout may be left to cure for a predetermined period of time before the second grout is applied. The predetermined period of time may be determined based on the volume of the first grout applied and/or a water temperature at the foundation pile.

The method may comprise testing the grout applied to the first region (i.e. the first grout), e.g. to determine whether it has cured. The method may comprise testing the grout applied to the first region (i.e. the first grout) before applying the grout to the second region (i.e. the second grout).

The grout or second grout may be applied to the second region until it fills or overflows the second region.

Filling or overflow of grout from the second region may be determined acoustically and/or visually. Filling or overflow of grout from the second region may be determined using a remotely operated vehicle (ROV). Filling or overflow of grout from the second region may be determined using a density gauge or density meter, e.g. an ultrasonic density gauge or meter or nuclear density gauge or meter.

The method may comprise applying grout to the first region via a first conduit extending through or along the leg, e.g. from a surface location such as a vessel. The first conduit may have a first outlet at or towards the bottom of the respective leg. The grout may be applied to the second region via a second conduit extending through or along the leg, e.g. from the surface location. The second conduit may have a second outlet on or towards the side of the respective leg.

The second outlet may be above the first outlet. The second outlet may be spaced from the first outlet. The second outlet may be further spaced from the sea floor than the first outlet when the leg is located in the foundation pile. The second outlet may be rotationally offset from the first outlet.

Grout may be applied to the first region via a conduit extending from a surface location. The conduit may be positioned such that an outlet of the conduit is at a first position on, or proximate to, the sea floor within the foundation pile. Grout may be subsequently applied to the second region by raising the conduit such that the outlet is at a second position, further spaced from the sea floor than the first position.

The conduit may comprise a rigid tube having a first open end for receipt of grout, a sidewall and an outlet. The outlet may be disposed in the sidewall. The rigid may comprise a second end, e.g. opposite the first end. The second end may be a closed end. The outlet may be disposed in the sidewall proximate to the closed end.

The conduit is preferably separate from the offshore structure and the foundation pile. For example, the conduit may be carried onboard, and deployed from, a seagoing vessel, e.g. a supply ship.

The method may comprise preparing grout (i.e. second grout) to be applied to the second region, after applying grout (i.e. first grout) to the first region. That is, the method may comprise preparing the second grout after applying the first grout, e.g. to the first region. The method may comprise preparing the second grout after allowing the first grout to cure, e.g. to a predetermined degree.

The composition of the grout may be prepared in dependence on water temperature on the day of application.

The composition of the first grout and/or second grout may be prepared in dependence on water temperature on the day of application.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DESCRIPTION OF THE INVENTION

Figure 1:
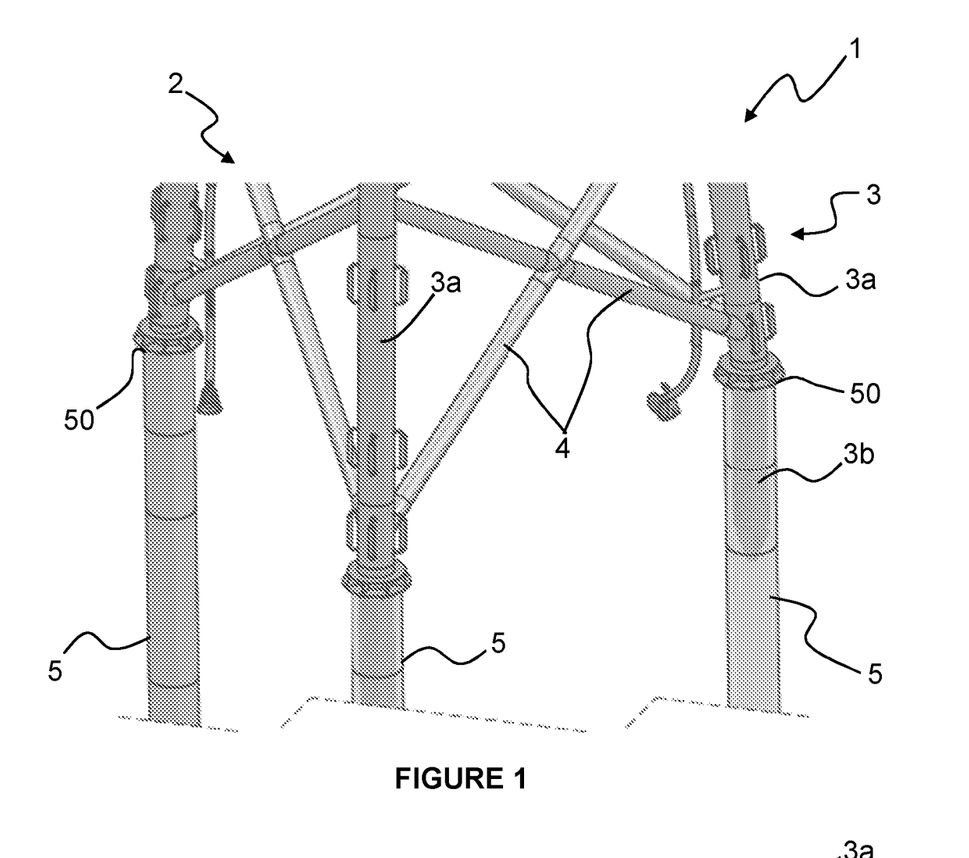
FIG. 1 shows an offshore structure fixed to foundation piles.

Referring now to FIG. 1, there is shown an offshore structure 1 for supporting a payload (not shown) above the surface of a body of water. In different examples, the payload (not shown) may be a wind turbine or an oil and gas platform. The offshore structure 1 includes a jacket 2 having three legs 3. In this example, the legs 3 are interconnected by cross-members 4. Each leg 3 has a main body 3a and stab-in portion 3b (shown more clearly in FIG. 3, in particular). Each of the main body 3a and stab-in portion 3b are hollow steel tubes in this example. In other examples, the main body 3a and stab-in portion 3b of each leg 3 may comprise a different material and construction. In this example the offshore structure 1 has three legs 3, but it will be appreciated that the offshore structure 1 may have any number of legs 3, including four legs 3.

Figure 4:
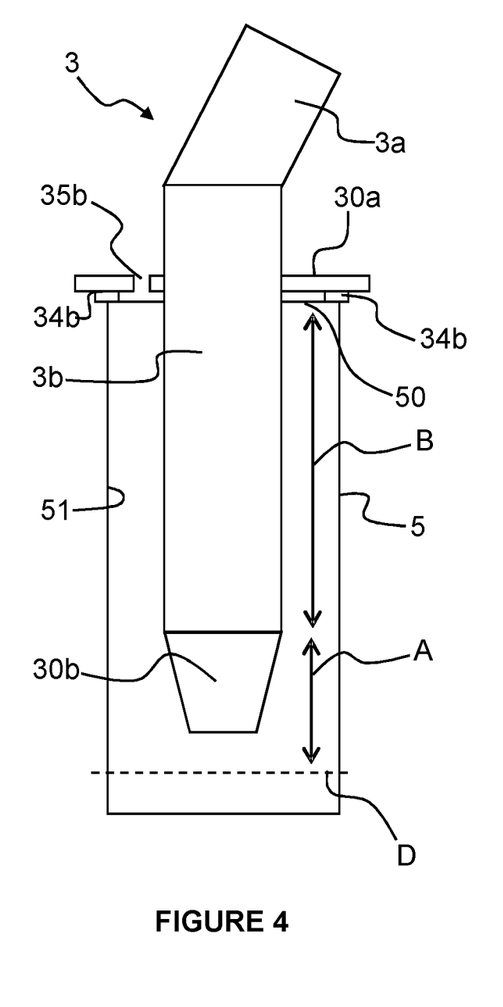
FIG. 4 is a schematic cross-section showing a leg of an offshore structure inserted into a foundation pile.
Figure 5:
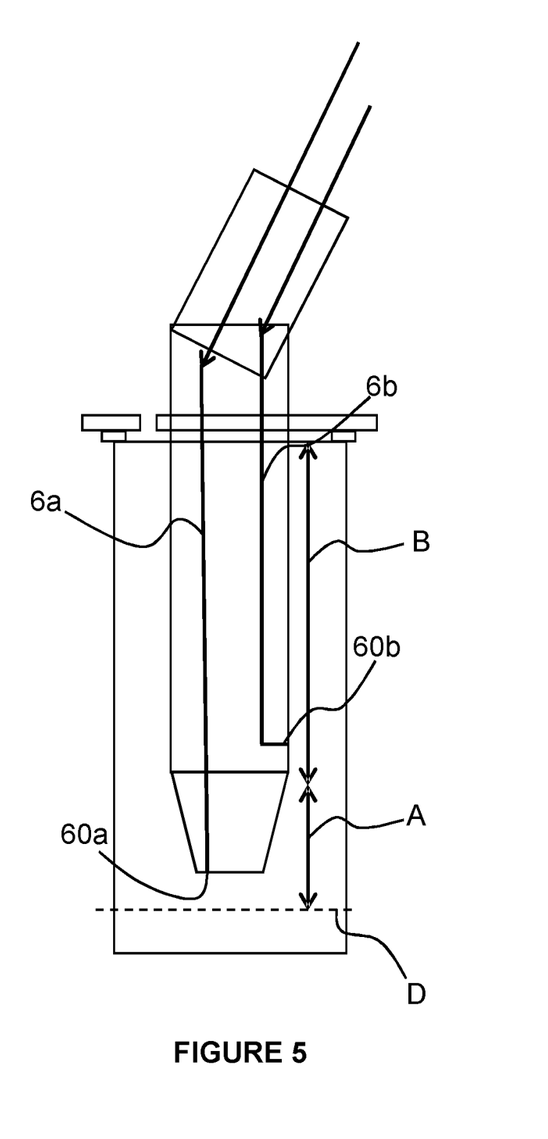
FIG. 5 is the arrangement of FIG. 4 including an apparatus for applying grout.
Figure 6:
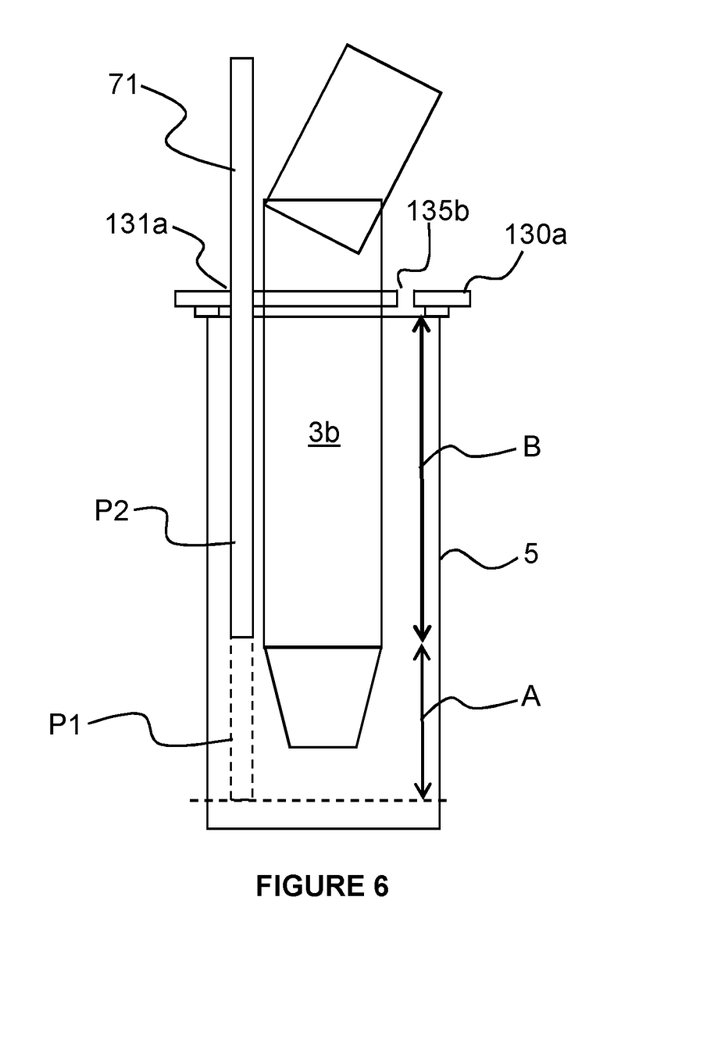
FIG. 6 is the arrangement of FIG. 4 including another apparatus for applying grout.

The offshore structure 1 is secured to the seabed by fixing it to the foundation piles 5, which are hollow steel tubes pre-piled into the seabed in this example. The stab-in portion 3b of each leg 3 is received within an open end 50 of a respective foundation pile 5. A cementitious material, in the form of grout, is used to at least substantially fill the remaining region or volume between the stab-in portion 3b and foundation pile 5 (made up of regions A and B, as shown in FIGS. 4 to 6, in particular), and thereby fix the jacket 2 to the foundation pile 5.

Figure 2:
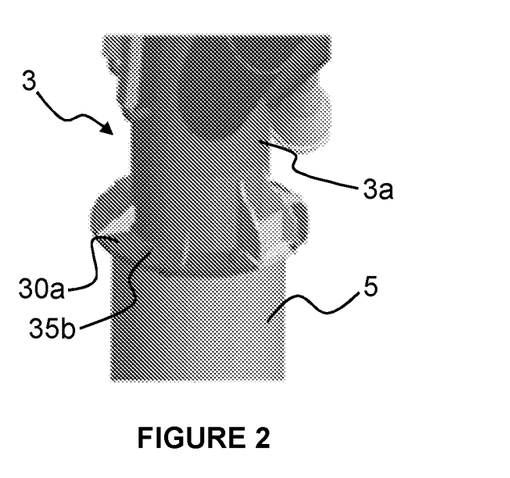
FIG. 2 shows the interface between a leg of an offshore structure and a foundation pile.

Referring now to FIG. 2 there is shown the interface between a jacket 2 and a foundation pile 5 with the stab-in portion 3b inserted into the foundation pile 5. Located between the main body 3a and stab-in portion 3b on each leg is a flange 30a. The flange 30a is radially extending. When a respective stab-in portion 3b is located within a respective foundation pile 5, the flange 30a braces against the rim at the open end 50 of the foundation pile 5. The position of the flange 30a on the leg 3 defines the amount of the leg 3, in particular the stab-in portion 3b, that is inserted into the foundation pile 5. Extending through the flange 30a is an overflow outlet 35b (shown more clearly in FIG. 4), allowing the overflow of excess grout during a grouting operation as described further hereafter.

Figure 3:
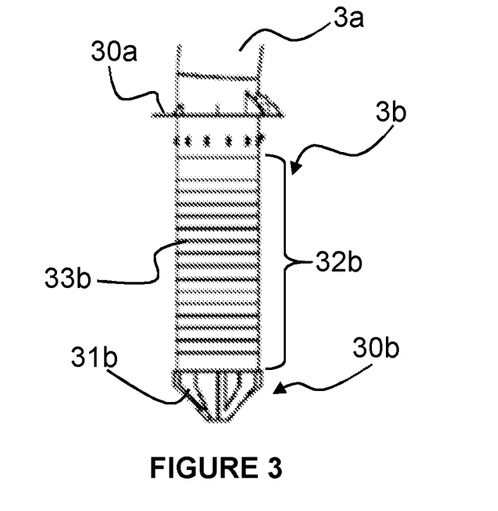
FIG. 3 is a side-view showing a stab-in portion of a leg of an offshore structure.

Referring now to FIG. 3, there is shown a stab-in portion 3b of a leg 3. At an end of the stab-in portion 3b, distal of the flange 30a, is a tapered end portion 30b. The end portion 30b may be integral to the tubular part of the stab-in portion 3b, or it may be formed by a cap that is inserted into an end of the stab-in portion 3b. The end portion 30b includes a plurality of circumferentially spaced, radially extending fins 31b. The geometry of the end portion 30b is configured to ease the location of the stab-in portion 3b within a respective foundation pile 5 and therefore make is easier to insert the leg 3 into the foundation pile 5.

Extending between the flange 30a and end portion 30b is a sidewall 32b. In the present example the stab-in portion 3b includes a plurality of shear keys 33b located along the length of the sidewall 32b, between the flange 30a and end portion 30b. The shear keys 33b are preferably formed of ridges in the surface of the stab-in portion 3b. The shear keys 33b are configured to provide resistance to relative translational movement between the stab-in portion 3b and the foundation pile 5 after the leg 3 has been grouted to the foundation pile 5, to provide a better fixing of the leg 3 to the foundation pile 5.

Referring now to FIG. 4, as described above when the stab-in portion 3b is located within a foundation pile 5, the flange 30a acts as a stopper, limiting the depth to which the stab-in portion 3b extends into the open end of the foundation pile 5.

In some examples, an underside of the flange 30a has a circumferentially extending seal 34b, in the form of an elastomeric O-ring, configured to seal against the free-end 50 of foundation pile 5. Radially inward of the circumferentially extending seal 34b is the overflow outlet 35b, described above.

FIG. 4 shows dredge line D. The dredge line D is the level of the sea floor within the foundation pile 5 after a piling operation has been carried out. In the present example, the dredge line D lies below the surrounding sea floor (not shown), but may alternatively be level with, or above the sea floor. As illustrated, the leg 3 is inserted into the foundation pile 5 such that the end portion 30b is spaced from the sea floor within the foundation pile 5 (i.e. spaced from the dredge line D).

With the stab-in 3b located within the foundation pile 5, a region A is described between the end portion 30b and the dredge line D within the foundation pile 5. Additionally, an annular region B is described between the sidewall 32b and internal wall 51 of the foundation pile 5. During a grouting process (described below), grout is provided to region A and region B. When region A and region B are full, grout will overflow the annular region B through outlet 35b. The seal 34b is configured to prevent the leakage of grout from points or areas other than the outlet 35b.

It will be appreciated that, in the present example, in the case of a jacket 2 having a plurality of legs 3, each will have an arrangement as per FIG. 4.

To secure the leg 3 to the foundation pile 5, the sea floor is preferably dredged prior to installing foundation piles 5. Then, one or more foundation piles 5 are piled into the sea floor to a desired depth and such that an open end 50 of each pile 5 protrudes from the sea floor. The jacket 2 is then lowered towards the sea floor and respective stab-in portions 3b are located within open ends 50 of respective foundation piles 5. The jacket 2 is lowered until each flange 30a braces against a respective open end 50, describing regions A and B. Grout is then applied to the regions A and B, as described below.

Referring now to FIG. 5, there is shown the arrangement of FIG. 4 having an apparatus for applying grout installed therein. In the present example, a first conduit 6a extends from an upper part of the jacket to a first outlet 60a at the bottom of end portion 30b. A grout pump or material feed (e.g. a hopper or storage tank) may be connected to the first conduit 6a, e.g. at a location on the surface, to supply grout thereto. A second conduit 6b extends from an upper part of the jacket to a second outlet 60b on the sidewall 32b of the stab-in portion 3b. A grout pump or material feed may be connected to the second conduit 6b, e.g. at a location on the surface, to supply grout thereto. Each of the conduits 6a, 6b extend along the inside of the leg 3 between the surface and their respective outlets 60a, 60b.

In use, in order to apply grout to the volume described between the stab-in portion 3b and foundation pile 5, a grout composition is prepared on the surface and conveyed along the first conduit 6a and to the first outlet 60a. The grout is conveyed until region A is filled.

Preferably, a predetermined volume of grout is conveyed into region A. The predetermined volume is based on the known diameter of the foundation pile and the specified distance between the sea floor within the foundation pile 5 (i.e. the dredge line) and the stab-in portion 3b. In other examples, the first conduit 6a and/or second conduit 6b may include a sensor that detects when the grout in region A reaches a certain level, e.g. along the length of the first conduit 6a and/or second conduit 6b, corresponding to the desired depth of region A.

Alternatively, filling of region A may be determined by using a pressure sensor or transducer located on either the first conduit 6a or second conduit 6b, or within the volume described by regions A. The filling of region A may be determined acoustically, for example by an acoustic sensor on a remotely operated vehicle (ROV), or on the leg 3.

Once region A is filled, the pump unit is switched off and the grout filling region A is left to cure to a predetermined degree.

Once the grout filling region A has cured to the predetermined degree, grout is conveyed along the second conduit 6b to the second outlet 60b. The grout is conveyed until region B is filled.

In the present example, the filling of region B is identified by the presence of grout at overflow outlet 35b. However, it will be appreciated that instead of providing an overflow outlet 35b, the filling of region B may be determined acoustically, for example by an acoustic sensor on a remotely operated vehicle (ROV), or on the leg 3. Alternatively, filling of region B may be determined by using a pressure sensor or transducer located either on the stinger 7 or within the volume described by regions A and B. In such a case, in the absence of overflow outlet 35b, once region B is full, a pressure increase may be detected if the pump unit P remains activated. In other examples, a predetermined volume of grout is conveyed into the region B based on the known dimensions of the stab-in portion 3b and the foundation pile 5. Such an example might be advantageous where no flange 30a is provided, to prevent overflow of the grout.

In the present example, the grout composition conveyed along the first conduit 6a and second conduit 6b is the same.

In the case of an offshore structure 1 having a plurality of legs 3 received within respective foundation piles 5, in the present example, each leg 3 will have the arrangement of FIG. 5. In such a case, region A of each leg 3 is filled with grout. This is effected by connecting each of the first conduits 6a to a grout pump or material feed, either consecutively or simultaneously, and feeding grout to each of the respective first regions A via the first conduits 6a. The grout is left to cure to a predetermined degree before region B is filled.

Whilst it is described that the grout composition conveyed along the first conduit 6a and second conduit 6b, i.e. filling the region A and region B, is the same, this need not be the case. Instead, a first grout composition may fill region A and second grout composition, different from the first grout composition, may fill region B.

Figure 7A:
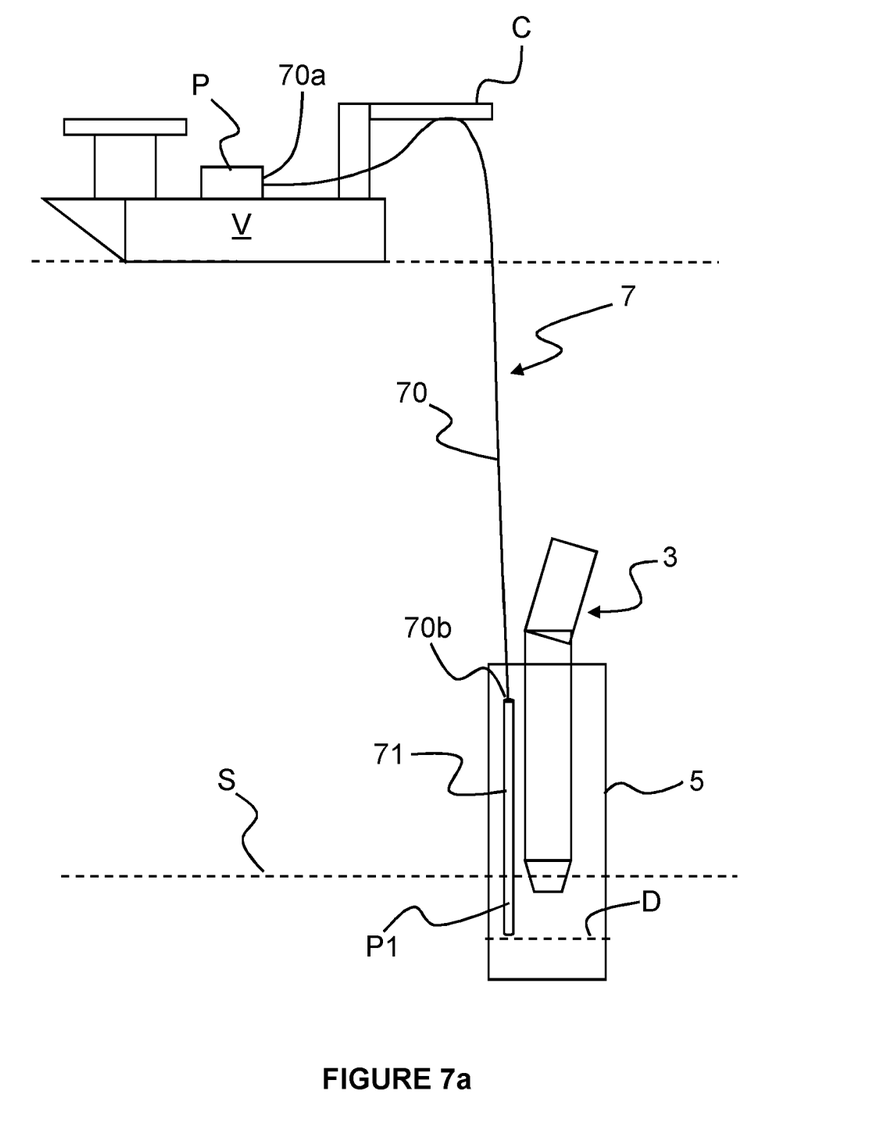
FIG. 7a is a schematic showing the apparatus of FIG. 6 in a first position.
Figure 7B:
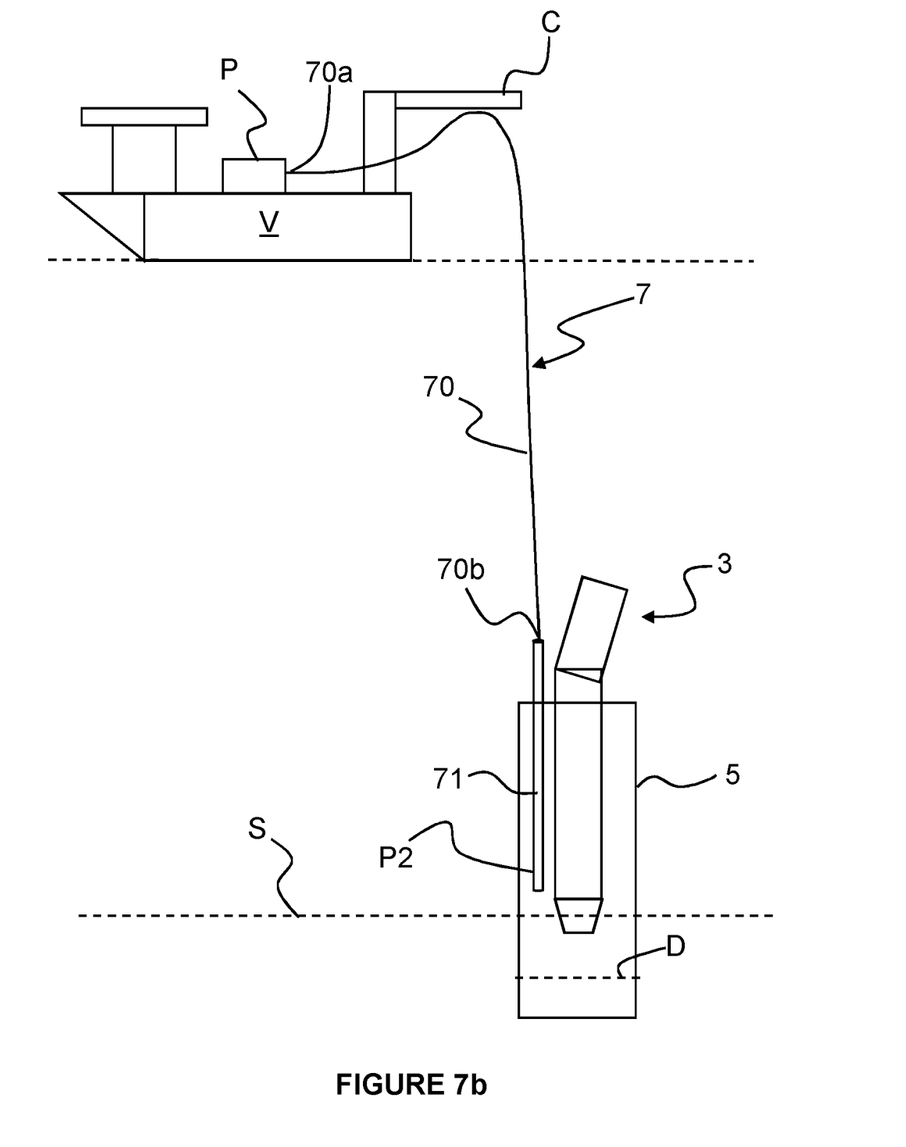
FIG. 7b is a schematic showing the apparatus of FIG. 6 in a second position.
Figure 8:
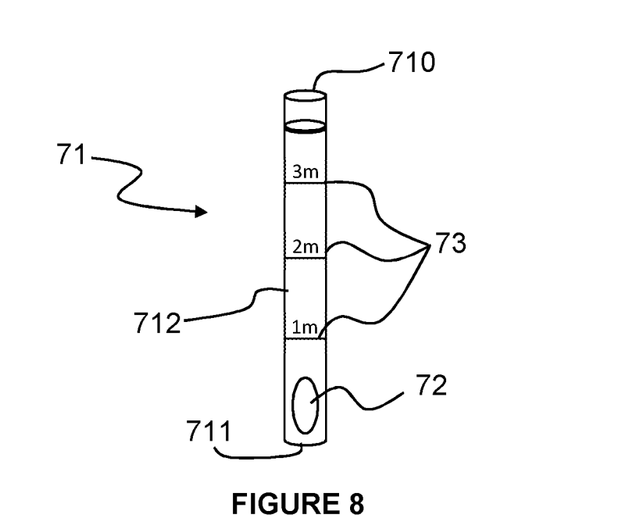
FIG. 8 shows part of the apparatus of FIGS. 6 and 7.

Referring now to FIGS. 6 to 8, there is shown an another apparatus for applying grout to an offshore structure 1 having a leg 3 inserted into a foundation pile 5. In particular, the apparatus is for filling the regions A and B as described above with grout. In the present example, a stinger 7 extends from a vessel V (FIGS. 7a, 7b) on the surface. The flange 130a differs from flange 30a in that it includes a further aperture, in form of inlet 131a for receipt of the stinger 7, in addition to overflow outlet 135b. The stinger 7 extends into the volume described between the stab-in portion 3b and the foundation pile 5.

As shown most clearly in FIGS. 7a and 7b, the stinger 7 has a flexible conduit or hose 70 having a first end 70a connected to a source of grout, in particular a pump unit P onboard the vessel V, and a second end 70b connected to a rigid tube 71. The rigid tube 71 is formed of steel in this example. The flexible conduit 70 is hoisted by a crane C onboard the vessel V, but may additionally or alternatively be located on a reel or spool. The flexible conduit 70 may support the weight of the rigid tube 71 as well as being a conduit for grout, or alternatively the rigid tube 71 is suspended on a tether and a separate conduit is provided to supply grout to the rigid tube 71. For example, the rigid tube 71 may be suspended on a chain, while a hose supplies grout to the rigid tube 71.

As shown in FIG. 8, in particular, the rigid tube 71 has a first, open end 710 for connection with the flexible conduit 70, and a second, closed end 711 opposite the first end 710. The sidewall 712 of the rigid tube 71, proximate the closed end 711 in this example, has an outlet 72 for grout. The closed end 711 is preferably provided by a welded cap, but may be folded closed or plugged.

Indicia or markings 73 are provided along the length of the rigid tube 71, on an external surface of the sidewall 712. In the present example, the indicia or markings 73 specify the distance from the centre of the outlet 72 to discrete points along the length of the rigid tube 71. Such indicia 73 provide an indication of the depth to which the outlet 72 is inserted into the volume between the stab-in portion 3b and foundation pile 5.

Alternatively, the indicia 73 may specify the distance from closed end 711 to discrete points along the length of the rigid tube 71.

A grouting operation using the apparatus of FIGS. 6 to 8 is carried out as shown in FIGS. 6, 7a and 7b, in particular. The stinger 7 is connected to the pump unit P and lowered from the vessel V toward the seabed S (FIGS. 7a and 7b). The rigid tube 71 is located with the inlet 131a and lowered into the volume described between the stab-in portion 3b and foundation pile 5.

In a first stage, the stinger 7 is lowered to a first position P1 as shown by the broken outline in FIG. 6 and also shown in FIG. 7a. In the first position P1, the closed end 711 is located at or approximate the dredge line D within the foundation pile 5. To reach this position, the stinger 7 may be lowered until the tension in the tether is decreasing, indicating that the stinger 7 is resting on the sea floor. The stinger 7 may then optionally be raised slightly to lift it off the sea floor. Grout is then conveyed, using the pump unit P, along the stinger 7 to the outlet 72. Grout is conveyed until the region A is filled. Preferably, a predetermined volume of grout is conveyed into region A. The predetermined volume is based on the known internal diameter of the foundation pile 5 and the specified distance between sea floor within the foundation pile 5 (i.e. the dredge line) and the stab-in portion 3b. In other examples, the stinger 7 and/or stab-in portion 3b may include a sensor that detects when the grout in region A reaches a certain level along the length of the rigid tube 71 corresponding to the desired depth of region A.

In the present example, once region A is full, the stinger 7 is then raised by the crane C and the grout filling region A is left to cure to a predetermined degree. The degree of curing may be determined based on the water temperature and a known curing rate of the grout.

The stinger 7 may be raised to a second position P2, as shown by the solid outline in FIG. 6 and also shown in FIG. 7b. The second position P2 is above the first position and above the region A. In some examples, the stinger 7 is removed from the foundation pile 5 and moved to other foundation piles 5 of the offshore structure 1 to repeat application of grout to region A, as described further hereinafter.

After the grout filling region A has cured to the predetermined degree, the stinger 7 is moved to the second position P2.

Then, with the stinger 7 in the second position P2, grout is conveyed, using the pump unit P, along the stinger 7 to the outlet 72 to fill region B. Grout is conveyed until region B is filled.

In the present example, the filling of region B is identified by the presence of grout at overflow outlet 135b. However, it will be appreciated that instead of providing an overflow outlet 135b, the filling of region B may be determined acoustically, for example by an acoustic sensor on a remotely operated vehicle (ROV), or on the leg 3. Alternatively, filling of region B may be determined by using a pressure sensor or transducer located either on the stinger 7 or within the volume described by regions A and B. In such a case, in the absence of overflow outlet 135b (or with a restricted overflow outlet 135b), once region B is full, a pressure increase may be detected if the pump unit P remains activated. In other examples, a predetermined volume of grout is conveyed into the region B based on the known dimensions of the stab-in portion 3b and the foundation pile 5. Such an example might be advantageous where no flange 130a is provided, to prevent overflow of the grout.

Figure 9:
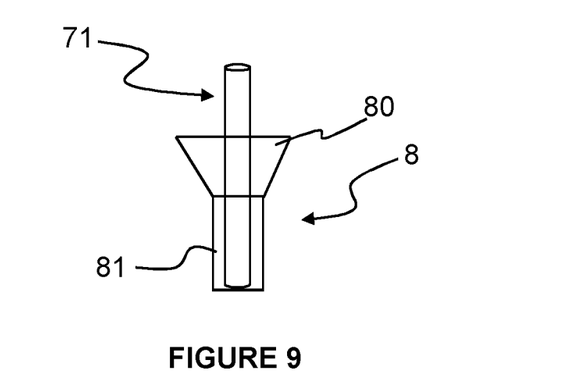
FIG. 9 shows a funnel guide for guiding the apparatus of FIGS. 6 to 8, in use.

Referring now to FIG. 9, there is shown a funnel guide 8 for guiding a stinger 7 through the inlet 131a in the flange 130a and into the volume between the stab-in portion 3b and foundation pile 5. The funnel guide 8 has a conical portion 80 that tapers towards the inlet 131a. In the present example, in connection with the conical portion 80 is a sleeve 81, configured to be inserted into the inlet 131a.

In examples, the funnel guide 8 may be formed integrally with the flange 30a or 130a.

In use, the funnel guide 8 is used to provide a larger target area for the stinger 7, in particular the rigid tube 71 thereof. This helps locate the stinger 7 with the inlet 131a when it is lowered towards the seafloor.

It will be appreciated by those skilled in the art that several variations to the aforementioned embodiments are envisaged without departing from the scope of the invention.

It will also be appreciated by those skilled in the art that any number of combinations of the aforementioned features and/or those shown in the appended drawings provide clear advantages over the prior art and are therefore within the scope of the invention described herein.

The invention claimed is:

1. A method of fixing an offshore structure to a pre-piled foundation pile positioned on a sea floor, wherein the foundation pile comprises a tube piled into the sea floor and the offshore structure comprises a leg inserted into a proximal end of the foundation pile, wherein the method comprises applying grout to a first region between an end portion of the leg inserted into the foundation pile and the sea floor entrapped within the foundation pile, a dredge line defined by level of the sea floor within the foundation pile after the tube has been piled, allowing the grout to at least partially cure proximal to the dredge line, and then applying grout to a second region abutting the at least partially cured grout, wherein the second region is an annular region between the leg and the foundation pile.

2. The method according to claim 1, wherein the offshore structure comprises a plurality of foundation piles and the jacket comprises a plurality of corresponding legs, each leg being inserted into an open end of a respective foundation pile.

3. The method according to claim 2, comprising applying the grout to the first regions of all of the plurality of foundation piles prior to applying the grout to the second regions of the plurality of foundation piles.

4. The method according to claim 1, wherein the grout applied to the first region is left to cure to a predetermined degree before applying the grout to the second region.

5. The method according to claim 1, comprising testing the grout applied to the first region to determine whether it has cured to a predetermined degree before applying the grout to the second region.

6. The method according to claim 1, wherein the grout is applied to the second region until it overflows the second region.

7. The method according to claim 6, wherein overflow of grout from the second region is detected acoustically and/or visually.

8. The method according to claim 1, wherein the grout is applied to the first region via a first conduit extending through or along the leg from a surface location, the first conduit having a first outlet at or towards the bottom of the respective leg, and the grout is applied to the second region via a second conduit extending through or along the leg from the surface location, the second conduit having a second outlet on or towards the side of the respective leg.

9. The method according to claim 1, wherein grout is applied via a conduit extending from a surface location, the method comprising applying grout to the first region by positioning the conduit such that an outlet thereof is positioned on, or proximate to, the sea floor within the foundation pile, and wherein grout is applied to the annular region by first raising the conduit such that the outlet is positioned at a second position, further spaced from the sea floor than the first position.

10. The method according to claim 1, wherein the grout applied to the first region comprises a first grout, and the grout applied to the second region comprises a second grout.

11. The method according to claim 10, wherein the first grout and the second grout have substantially the same or corresponding composition.

12. The method according to claim 10, wherein the first grout and second grout have different compositions.

13. The method according to claim 10, comprising preparing the second grout after applying the first grout to the first region.

14. The method according to claim 10, wherein the composition of the first grout and/or second grout is prepared in dependence on water temperature on the day of application.

15. The method according to claim 11, wherein the first grout and second grout have different compositions.

* * * * *